(12) United States Patent
Kopec et al.

(10) Patent No.: US 7,658,777 B2
(45) Date of Patent: Feb. 9, 2010

(54) FILTER ELEMENT AND FILTER SYSTEM FOR THE INTAKE AIR OF AN INTERNAL COMBUSTION ENGINE

(75) Inventors: Edvard Kopec, Passau (DE); Klaus-Dieter Ruhland, Meckenheim (DE); Oliver Steins, Waldsee (DE); Ralf Poh, Neustadt (DE)

(73) Assignee: Mann + Hummel GmbH, Ludwigsburg (DE)

( * ) Notice: Subject to any disclaimer, the term of this patent is extended or adjusted under 35 U.S.C. 154(b) by 371 days.

(21) Appl. No.: 11/700,037

(22) Filed: Jan. 31, 2007

(65) Prior Publication Data

US 2007/0175187 A1    Aug. 2, 2007

(30) Foreign Application Priority Data

Jan. 31, 2006    (DE) .................. 20 2006 001 440 U (51) Int. Cl.
*B01D 46/00* (2006.01)
(52) U.S. Cl. .................. 55/502; 55/385.3; 55/498; 55/503; 55/521
(58) Field of Classification Search .............. 55/385.3, 55/498, 502, 503, 504, 521
See application file for complete search history.

(56) References Cited

U.S. PATENT DOCUMENTS

| | | | | |
|---|---|---|---|---|
| 5,397,632 A * | 3/1995 | Murphy et al. | | 442/358 |
| 5,472,464 A * | 12/1995 | Mochida | | 55/385.3 |
| 5,569,311 A * | 10/1996 | Oda et al. | | 55/493 |
| 5,730,768 A * | 3/1998 | Kaminaga et al. | | 55/385.3 |
| 5,795,361 A * | 8/1998 | Lanier et al. | | 55/502 |
| 5,902,364 A * | 5/1999 | Tokar et al. | | 55/498 |
| 6,235,195 B1 * | 5/2001 | Tokar | | 210/238 |
| 6,598,580 B2 * | 7/2003 | Baumann et al. | | 123/198 E |
| 6,610,126 B2 * | 8/2003 | Xu et al. | | 95/273 |
| 6,716,266 B2 * | 4/2004 | McNaughton | | 55/495 |
| 6,752,846 B2 * | 6/2004 | Rotter et al. | | 55/385.3 |
| 6,878,190 B1 * | 4/2005 | Xu et al. | | 95/273 |
| 6,966,940 B2 * | 11/2005 | Krisko et al. | | 55/497 |
| 6,997,968 B2 * | 2/2006 | Xu et al. | | 55/495 |
| 7,258,718 B2 * | 8/2007 | Dworatzek et al. | | 55/502 |

(Continued)

FOREIGN PATENT DOCUMENTS

DE    196 04 577 C1    1/1997

(Continued)

OTHER PUBLICATIONS

Definition of "opposite" from Merriam-Webster Online dictionary, date unknown.*

(Continued)

*Primary Examiner*—Michael A Marcheschi
*Assistant Examiner*—Robert A Clemente (57) ABSTRACT

A filter element (12), particularly for the intake air of an internal combustion engine. The filter element (12) has a filter body (13) and a seal (15) disposed circumferentially around the filter body (13). The seal (15) is bonded to the filter body (13) with an adhesive (31) and includes a hard component (26) and a soft component (27). The hard component (26), which rests directly on a housing section, prevents the filter element (12) from moving relative to this housing section, and since the filter element cannot move relative to the housing section, damage to the filter element is avoided.

11 Claims, 6 Drawing Sheets

U.S. PATENT DOCUMENTS

| | | | |
|---|---|---|---|
| 7,318,851 B2 * | 1/2008 | Brown et al. | 55/498 |
| 7,393,375 B2 * | 7/2008 | Xu et al. | 55/495 |
| 7,396,376 B2 * | 7/2008 | Schrage et al. | 55/498 |
| 7,396,377 B2 * | 7/2008 | Lampert et al. | 55/502 |
| 7,491,254 B2 * | 2/2009 | Krisko et al. | 55/337 |
| 2007/0089386 A1 * | 4/2007 | Walz | 55/502 |
| 2007/0186528 A1 * | 8/2007 | Wydeven et al. | 55/498 |
| 2008/0110142 A1 * | 5/2008 | Nelson et al. | 55/357 |
| 2008/0307759 A1 * | 12/2008 | Reichter et al. | 55/428 |

FOREIGN PATENT DOCUMENTS

| | | |
|---|---|---|
| EP | 1 350 550 A1 | 10/2003 |
| WO | WO 2004/020075 A2 | 3/2004 |

OTHER PUBLICATIONS

European Search Report dated May 11, 2007 with an English translation of the pertinent portions (Six (6) pages).

* cited by examiner

FILTER ELEMENT AND FILTER SYSTEM FOR THE INTAKE AIR OF AN INTERNAL COMBUSTION ENGINE

BACKGROUND OF THE INVENTION

The present invention relates to a filter element, particularly for the intake air of an internal combustion engine or a compressor, comprising a filter body and a seal circumferentially disposed around the filter body. The invention further relates to a filter system incorporating such a filter element.

Published international patent application no. WO 2004/020075 discloses a filter system for the intake air of an internal combustion engine in which a filter element is clamped between two parts of the housing. The filter element is a wound filter formed of a coiled filter medium and a profiled seal disposed along the circumference. The profiled seal is formed of an elastic band circumferentially bonded to the filter medium coil. To this end, the seal has a circumferential surface extending parallel to the outside circumference of the filter coil and is adhesively bonded to the coiled filter medium. To obtain a good bond between the seal and the filter coil, the seal has a seal base, which is wider than the sealing bead. The seal base extends axially along the circumferential surface of the filter coil on both sides across the seal, so that the seal base protrudes in upward and downward direction. Since the seal is formed of an elastic material, the filter element can oscillate or vibrate axially inside the parts of the housing, which oscillation damages the filter element.

SUMMARY OF THE INVENTION

Accordingly, it is an object of the present invention to provide an improved filter element and filter system for filtering intake air of an internal combustion engine.

Another object of the invention is to provide a filter element and filter system in which a seal can be easily and cost-effectively attached to a filter body.

A further object of the invention is to provide a filter element and filter system in which damage due to vibration or oscillations is prevented.

These and other objects have been achieved in accordance with the present invention by providing a filter element comprising a filter body and a seal circumferentially disposed around the filter body, wherein the seal comprises a hard component and a soft component and is bonded to the filter body by an adhesive.

In accordance with a further aspect of the invention, the objects are also achieved by providing a filter system Advantageous refinements, preferred embodiments and optional features are described in further detail hereinafter.

The filter element according to the invention is used to clean a fluid stream, particularly the intake air for an internal combustion engine or a compressor. The filter element can of course also be used for other filtration functions. To this end, the filter element has a filter body formed of a filter medium. The filter medium, which is adapted to separate impurities from the fluid stream, can be a pleated, annularly closed filter paper, for example. Other embodiments of the filter body are also feasible, however, e.g., a filter paper wound into a filter coil with alternately closed channels or a filter block formed of a filter foam.

A circumferential seal with a hard component and a soft component is arranged around the filter body. The hard component is formed of a dimensionally stable material, such as plastic or metal, and is ring-shaped or annular. The soft component is formed of an elastic material, such as an elastomer, a thermoplastic elastomer (TPE) or a polyurethane resin (PUR) foam, which forms a reliable seal together with an adjoining part of the housing. The soft component is joined to the hard component so as to form a dimensionally stable seal extending around the filter body. This connection can be achieved, for example, by adhesively bonding, welding or clipping the components together. The hard component makes the seal stable enough to prevent oscillations that could damage the filter element in the installed state.

The seal is bonded to the filter body by an adhesive. The adhesive can form a bond over a large area between the hard or soft component and the filter body. In one advantageous embodiment, the adhesive forms an adhesive wedge between one or both components of the seal and the filter body. The seal is slipped over the filter body, so that a gap is formed between the filter body and the seal. A liquid adhesive is metered into this gap, which after curing joins the filter body to the seal in a sealing manner. Because the seal, together with the filter body, forms the seat for the adhesive, no expensive tundishes are required to bring the adhesive into a corresponding mold. The prefabricated seal is an easily manufactured low-cost component. The adhesive wedge firmly and reliably bonds the seal to the filter body, so that slippage or detachment of the seal from the filter body is reliably prevented.

In accordance with to one advantageous embodiment of the invention, two-component injection molding is used to manufacture the seal. In this process, the soft component is injection molded directly onto the hard component. Injection molding the soft component onto the hard component creates a permanent bond between the hard component and the soft component, at least in partial areas, enabling the seal to be joined to the filter body as a one-piece component. In addition, two-component injection molding is a simple and cost-effective method to manufacture the seal.

In another advantageous embodiment of the invention, the soft component of the seal has a sealing lip, which makes contact with the filter body along a linear circumferential contact zone. The sealing lip contacts the filter body, thereby producing a seal tight enough so that the adhesive remains in the gap formed between the seal and the filter body and does not run out during the manufacturing process. Because of the linear contact zone, the sealing lip contacts the filter body so as to form a seal around the circumference. Any unevennesses of the filter body can be compensated for as well because the sealing lip adapts to the filter body and follows these imperfections.

In yet another advantageous embodiment of the invention, the adhesive wedge is stiffer than the soft component. The soft component is formed of a soft material, which exhibits optimal sealing properties in the housing. The adhesive wedge, which is formed, for example, of a hot-melt adhesive, a casting resin, a polyurethane resin, silicone, or an epoxy resin, imparts high stability to the seal. Since the filter body cannot move axially relative to the seal, which is fixed within the housing, mechanical loading of the filter element within the filter housing is substantially reduced.

In one specific embodiment of the invention, the seal has a circumferential sealing bead. The sealing bead can, for example, have a rectangular, round or oval cross section, although it is of course possible to realize all desired geometries. The sealing bead is configured in such a way that it can be clamped between two halves of the housing to create a reliable seal between an unfiltered side and a filtered side. The adhesive flows into a gap between the sealing bead and the filter body. The adhesive wedge formed by the adhesive has corresponding radii or arcs to join the sealing bead to the filter body. The sealing bead can be formed either by the soft component alone or by both the soft and the hard component. The soft component has a sealing area that can be deformed by a housing section. The seal is created in this sealing area, so that no unfiltered volume flow can reach the filtered fluid side of the filter element.

In another embodiment of the invention, the soft component has a damping zone, which communicates with the hard component on the one hand and the housing geometry on the other. In this damping zone, the material of the soft component is compressed, so that oscillations of the housing are transmitted to the filter element in a damped manner. This reduces the oscillations transmitted to the filter element, thus reducing the vibrational loading of the filter element.

It is advantageous if the soft component is provided with a hollow space. The hollow space reduces the mass of material required to form the geometry and changes the pressure properties of the seal. Cycle times can be shortened and component weight reduced as a result of the reduced mass of material. The changed pressure properties of the seal make it possible to form a sealing area and a damping zone using the same material; the material being more easily deformable in the sealing area than in the damping zone. The hollow space is preferably produced by gas or water-assisted injection molding. These processes can be well controlled and enable mass production of seals with consistent sealing properties.

In yet another specific embodiment of the invention, the hard component has a structure with elevations and indentations on the side opposite the soft component. This structure interacts or mates with a negative structure in the housing, and as a result, the filter element can be mounted only in a single predetermined position within the housing. This prevents the filter element from being incorrectly inserted into the housing. Once mounted, the filter element also cannot move radially, so that damage due to rubbing against the housing is avoided.

The filter system according to the invention is specifically intended to clean the intake air of an internal combustion engine, but it can, of course, also be used to remove impurities from other fluid streams, especially gas streams. The filter system comprises at least one filter housing and one filter element having the features described above. The filter housing has an inlet, through which the air to be filtered can flow into the filter housing, and an outlet, through which the filtered air can flow out of the filter housing. The filter housing comprises at least two housing sections between which the filter element is disposed. The filter element is joined to at least one of the housing sections, forming a seal. This sealing connection is formed by a seal disposed on the filter element. The seal comprises a hard component and a soft component, such that the hard component communicates with one of the housing sections and the soft component contacts the other housing section. The housing section communicating with the hard component axially encloses the filter element at least in part. The contact between the hard component and the housing section prevents the filter element from moving relative to this housing section. As a result, the filter element does not rub against this housing section, and damage to the filter element is avoided.

According to a further refinement of the filter system according to the invention, the housing section communicating with the soft component has a circumferential projection that communicates with the soft component to form a seal. This projection is pressed into the soft component when the filter element is installed, such that the surface of the soft component adapts to the projection and thereby produces a seal. The projection can have any cross-section, e.g., triangular, sinusoidal or trapezoidal. Preferably, the projection has a cross section that tapers with increasing distance from the housing section. Thus, at first, the projection contacts the soft component with a very small area. As the projection penetrates deeper into the soft component, the cross-sectional area of the projection increases. The deformation of the soft component is greater in the area of the projection than in the areas adjacent the projection. This produces a reliable seal in the area of the projection, but the force required to form the seal is relatively small.

In one advantageous embodiment, the geometry of the housing section communicating with the hard component includes elevations and/or indentations. The hard component also has elevations and/or indentations, such that the elevations of the housing section engage the indentations in the hard component, and the elevations of the hard component engage the indentations in the housing section. The geometries correspond in such a way that they prevent insertion of a wrong filter element or incorrect insertion of a correct filter element. The inability of the filter element to assume its proper position within the housing prevents the housing from being closed, and in that way, the selection of an improper filter element or mis-positioning of a filter element can be detected. This prevents the filter system from being operated with the wrong or with an incorrectly installed filter element and avoids damage to the internal combustion engine. The housing can be closed only if an appropriate filter element is inserted in the specified orientation, so that improperly filtered air cannot damage the internal combustion engine.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
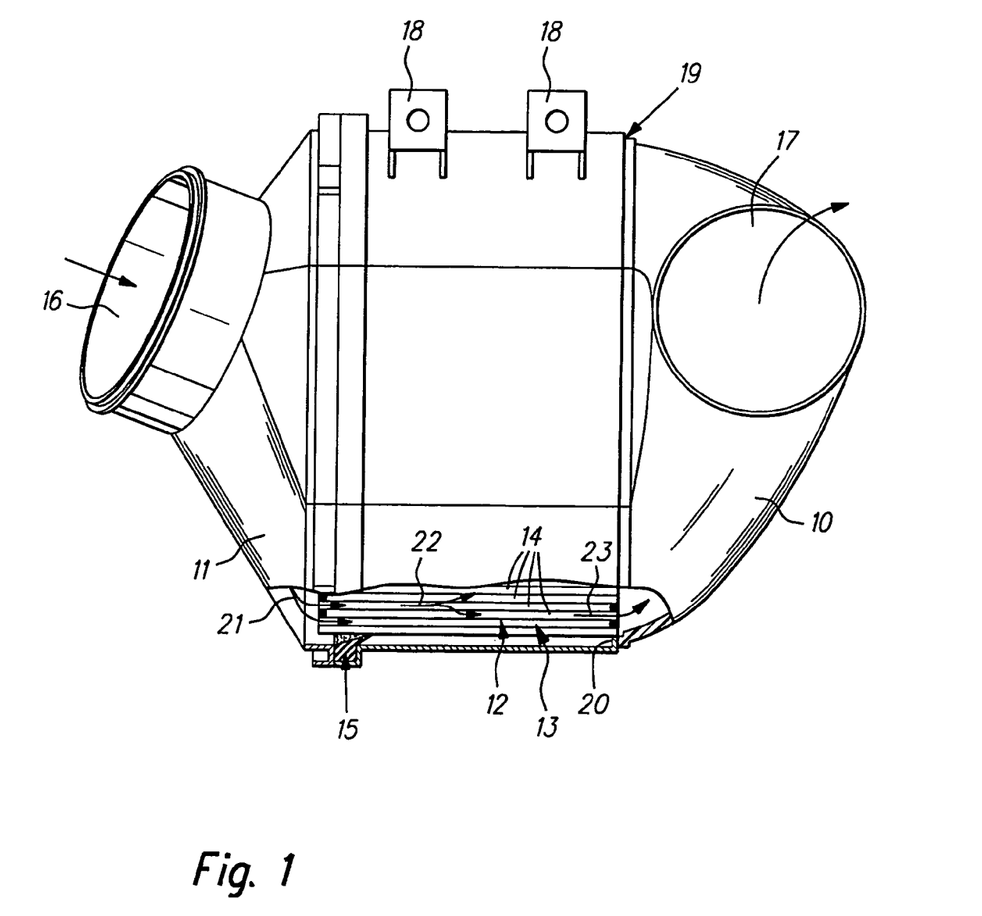
FIG. 1 is a partially cut-away representation of a filter system according to the invention.

FIG. 1 is a general view of a filter system which is partially cutaway in the lower portion of the figure. The filter system has a housing 10 with a lid 11 and an oval filter insert 12. The lid 11 is configured in such a way that it closes the housing 10, so that the housing 10 and the lid 11 form a filter enclosure. The filter insert 12 comprises a filter coil 13 with alternately closed channels 14 and a seal 15. The seal 15 is disposed between the lid 11 and the housing 10. The construction and arrangement of the seal 15 will be described in greater detail with reference to the subsequent figures.

The lid 11 has an inlet 16 through which the air to be filtered flows into the filter housing. The outlet 17 for the filtered air is arranged in the housing 10. The filter insert 12 is arranged in the filter housing such that the inlet 16 is separated from and sealed relative to the outlet 17. The filter insert 12 extends axially into the housing 10. The housing 10, which in this illustrative embodiment has a two-part construction, is provided with mounting brackets 18 with which the housing 10 can be fixed in its installation space. Because of its two-part construction, the housing 10 can be easily and cost-effectively manufactured using a plastic injection molding process. The two housing sections are joined together in a connection area 19. The joint in this area is produced by welding or adhesive bonding. In the interior of the housing 10, the filter insert 12 rests on a shoulder 20, which is located in proximity of the connecting area 19. The construction of the seal 15, which will be described below, prevents the filter insert 12 from moving relative to the housing 10. This prevents rubbing locations from forming on the filter insert 12.

The air to be filtered flows through the inlet 16 into the filter enclosure formed by the lid 11 and the housing 10. The unfiltered air enters the open channels 14 of the filter insert 12 in the direction indicated by arrow 21. The air then passes as shown by arrow 22 into adjacent channels 14 which are open toward the outlet 17, and as it passes through the filter medium between channels, the impurities are retained. The filtered air flows out of the channels 14 which are open toward the outlet 17 as indicated by arrow 23 and exits the filter housing through the outlet 17.

Figure 2:
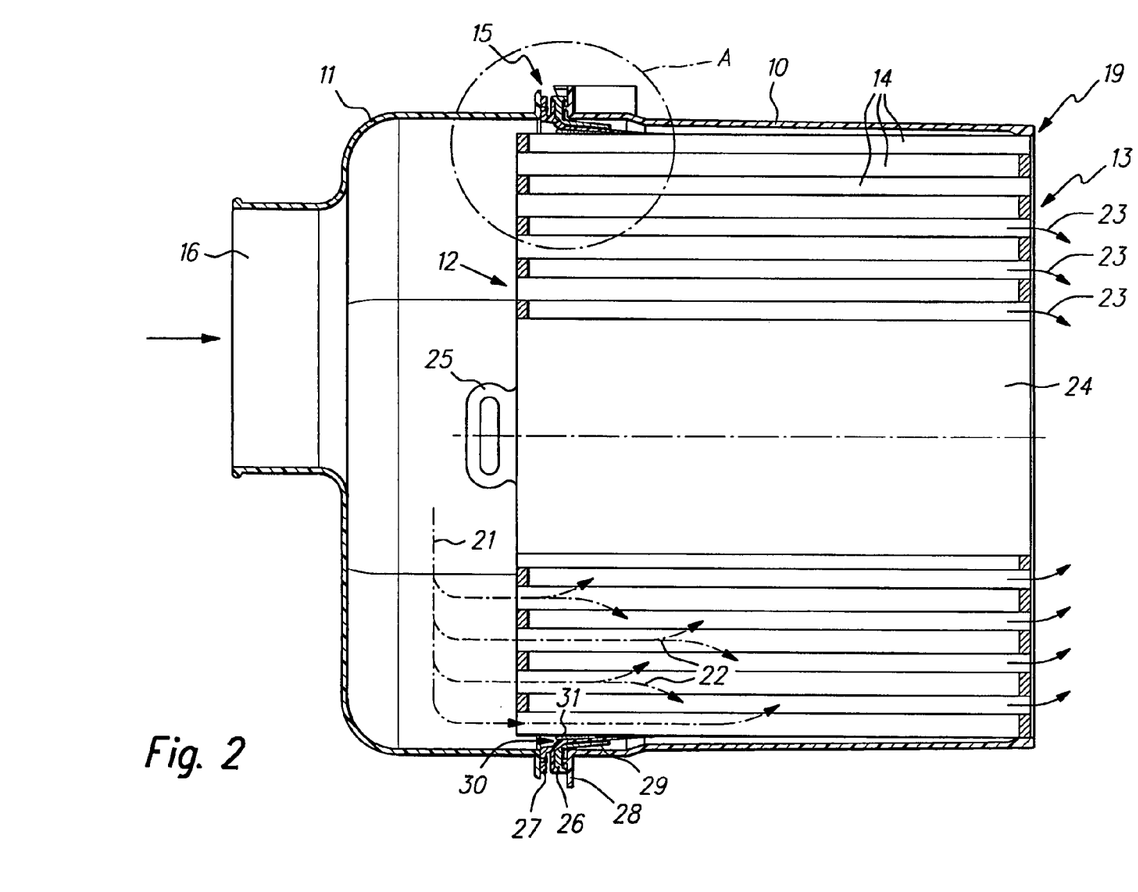
FIG. 2 is a sectional view of a detail of a filter system according to the invention.

FIG. 2 is a sectional view of a detail of the filter system according to FIG. 1. Components corresponding to those of FIG. 1 are identified by the same reference numerals. Only the section of the two-part housing 10 enclosing the filter insert 12 is shown. The other section of the housing 10 in which the outlet 17 is disposed is not depicted. The filter coil 13, which is formed by a filter medium having alternately closed channels 14, is spirally wound around a blade 24. The blade 24 is sealingly and permanently connected to the filter coil 13. An extraction handle 25 is arranged on the side of the blade 24 facing the inlet 16. This extraction handle 25 can be used to pull the filter insert 12 out of the housing 10 after removal of the lid 11.

The seal 15 of the filter insert 12 comprises an annular hard component 26 and a soft component 27 connected to this hard component 26. The soft component 27 has a sealing lip 29, which linearly contacts the filter coil 13. The sealing lip 29 encloses the circumference of the filter coil 13 in part, such that a gap 30 is formed between the sealing lip 29 and the filter coil 13, into which a measured amount of an adhesive 31 is dispensed. The adhesive 31 bonds the soft component 27 to the filter coil 13. The bonds between the soft component 27 and the hard component 26 and the adhesive 31 create a firm connection to the filter coil 13, so that the filter coil 13 is prevented from moving axially relative to the seal 15 formed by the hard and the soft components 26 and 27. The hard component 26 contacts the oval area of the housing 10 in the region of a seal seat 28. Because both the hard component 26 and the seal seat 28 of the housing 10 are essentially inflexible, the filter element 12 cannot move relative to the housing 10.

Figure 3:
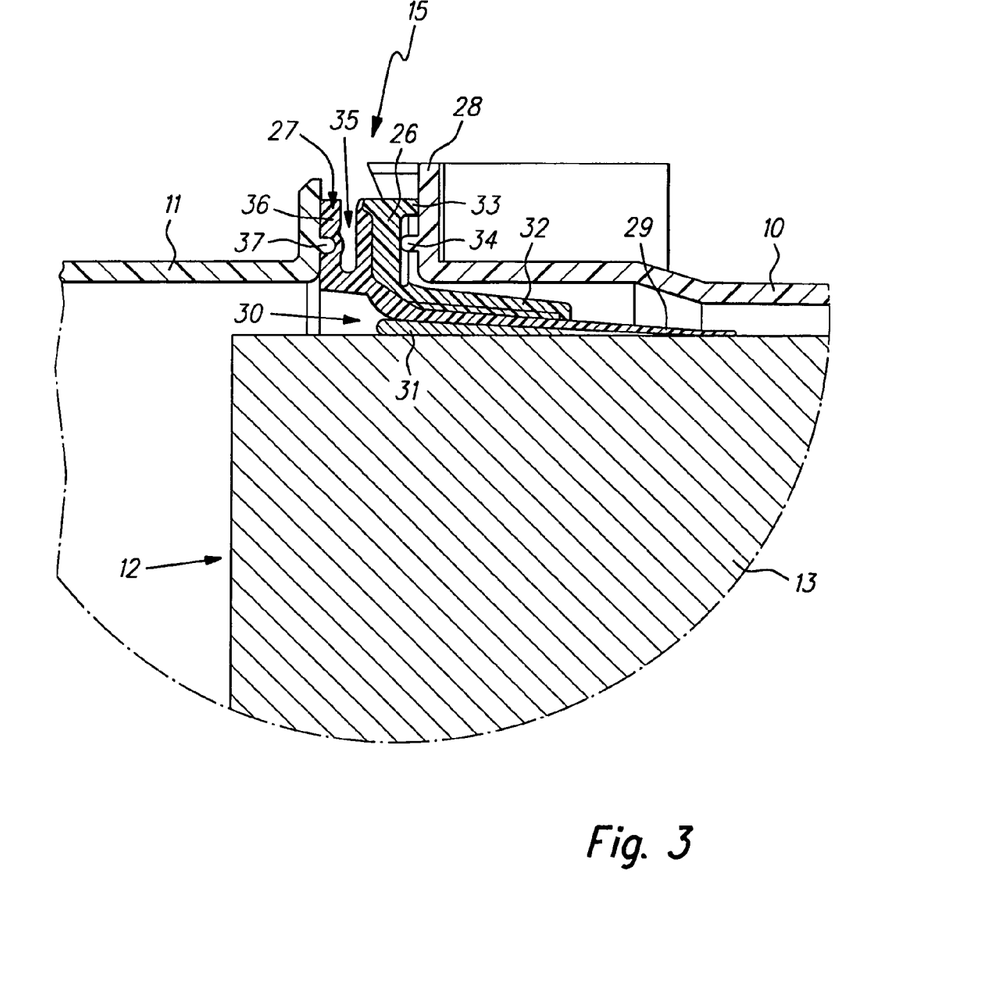
FIG. 3 is an enlarged detail view according to FIG. 2.

FIG. 3 shows an enlarged detail A of FIG. 2. Again, components corresponding to those of FIG. 2 are identified by the same reference numerals. The hard component 26 has a support area 32, which supports the sealing lip 29 of the soft component 27 in such a way that the soft component does not lift off the filter coil 13 when the adhesive 31 is injected. In addition, the seal 15 is stiffened to prevent any oscillations between the outside circumference of the seal 15 and the filter coil 13. The hard component 26 furthermore has a circumferential annular support bead 33, which rests against the seal seat 28 of the housing 10. In addition, the seal seat 28 has a likewise annular circumferential bead 34, against which the hard component 26 rests. Thus, the hard component 26 has two support locations on the housing 10, which are linear or torus-shaped.

The soft component 27, which is vulcanized onto the hard component 26, has a U-shaped sealing area 35 in addition to the sealing lip 29. The U-shape is open toward the outside circumference. One leg of the U-shape is firmly joined to the hard component 26. The opposite leg 36 contacts the lid 11, which has a circumferential projection 37 that presses into the leg 36 of the soft component 27 and thereby forms a seal between the filter insert 12 and the lid 11 of the filter housing.

Figure 4:
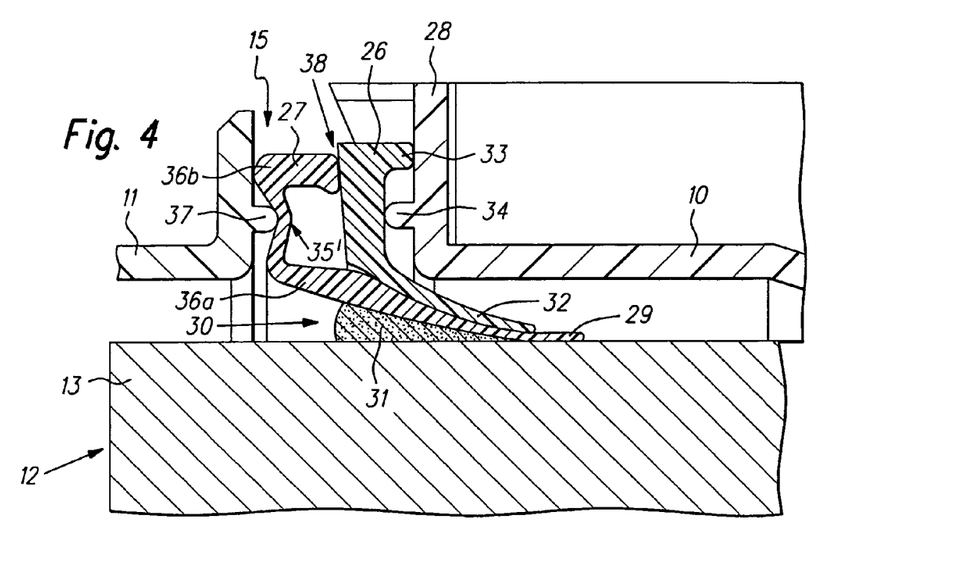
FIG. 4 is a detail view of an alternative filter embodiment.

FIG. 4 illustrates an alternative embodiment of the seal 15 shown in FIG. 3. Again, components corresponding to those of FIG. 3 are identified by the same reference numerals. The difference compared to the seal 15 depicted in FIG. 3 lies in the geometry of the soft component 27. In this embodiment, the soft component 27 also has a U-shaped geometry, but the U-shape is open toward the hard component 26. The radially inner leg 36a of the U-shape merges into the sealing lip 29, forming a firm connection between the support area 32 and the sealing lip 29. The radially outer leg 36b is thicker. When the lid 11 is placed on the housing 10, the outer leg 36b is compressed. In this compressed area, a damping zone 38 is formed between the seal 15 and the lid 11. As a result, the oscillations transmitted from the lid 11 to the filter insert 12 and the housing 10 are reduced. In this embodiment, the side of the U-shape connecting the legs 36a, 36b forms a sealing area 35' between the soft component 27 and the lid 11.

Figure 5:
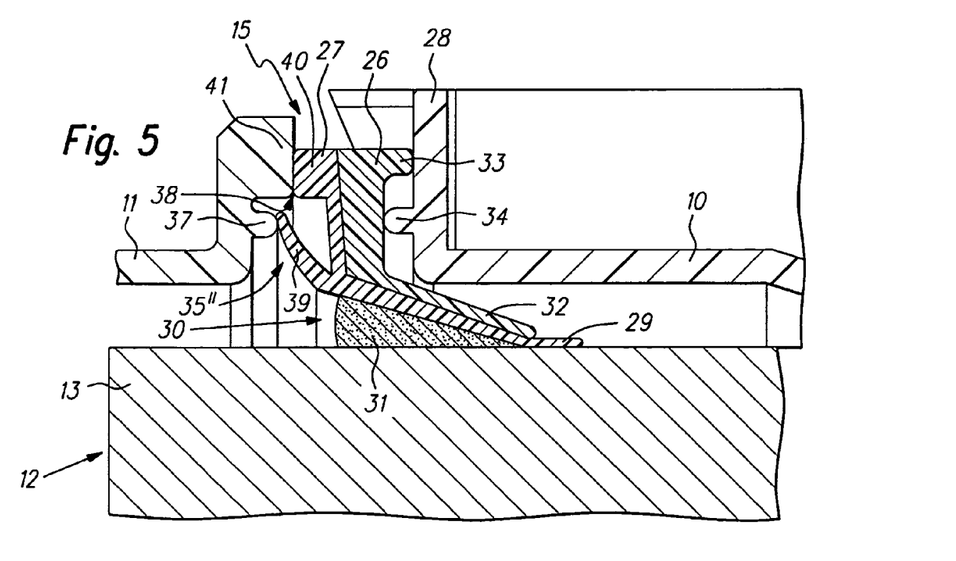
FIG. 5 is a detail view of another alternative filter embodiment.

FIG. 5 illustrates another alternative embodiment of the seals 15 depicted in FIGS. 3 and 4. Once again, components corresponding to those shown in FIGS. 3 and 4 are identified by the same reference numerals. The difference compared to the seal 15 shown in FIG. 3 lies in the geometry of the soft component 27 and the lid 11. The soft component 27 has another circumferential lip-shaped sealing member 39 in addition to the sealing lip 29, which contacts the filter coil 13. The sealing lip 29, which is connected to the hard component 26 merges, directly into the sealing member 39. In the assembled state, the sealing member 39 contacts the projection 37 on lid 11 to form a seal in sealing area 35". In addition, the soft component 27 has a damping foot 40, which is firmly connected to the hard component 26 by an annular rectangular cross section. Similarly to FIG. 4, a damping zone 38 is created between the damping foot 40 and a shoulder 41, which is formed on the lid 11, since the damping foot 40 is compressed when the lid 11 is installed in the closed position.

Figure 6:
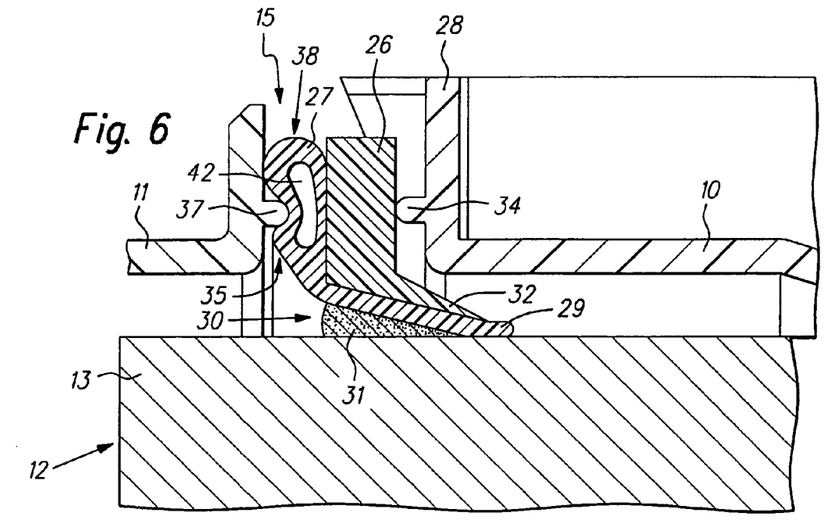
FIG. 6 is a detail view of yet another alternative embodiment.

FIG. 6 illustrates yet another alternative embodiment of the seals 15 shown in FIGS. 3 to 5. Components corresponding to those of FIG. 3 are again identified by the same reference numerals. The difference compared to the seal 15 shown in FIG. 3 lies in the geometry of the soft and hard components 27 and 26. In this embodiment, the hard component 26 is configured as a flat ring with a support area 32 formed onto it. The soft component 27 has a hollow space 42, which is produced by gas-assisted injection molding. Through the hollow space 42, the wall thickness of the soft component 27 is configured in such a way that a sealing area 35 is formed generally centrally of the hollow space 42 in conjunction with the projection 37. In the radially outer area of the soft component 27, a damping zone 38 is formed by the compression of the material of the soft component between the lid 11 and the hard component 26.

Figure 7:
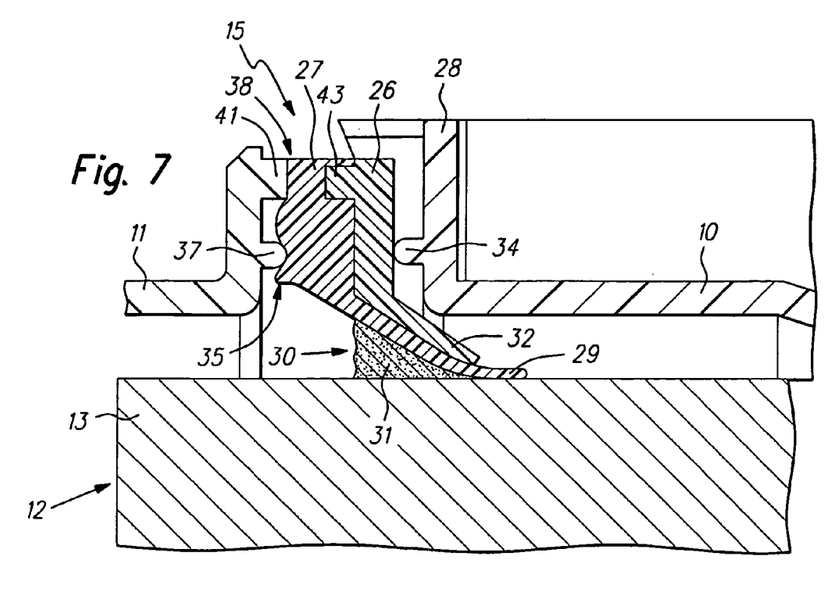
FIG. 7 is a detail view of a still further alternative embodiment.

FIG. 7 illustrates another alternative embodiment of the seals 15 depicted in FIGS. 3 to 6. Components corresponding to those shown in FIGS. 3 to 6 are once again identified by the same reference numerals. The difference compared to the seal 15 shown in FIG. 3 lies in the geometry of the soft component 27 and the hard component 26. In addition, the lid 11 has a shoulder 41 like the one shown in FIG. 5. The hard component 26, apart from the support area 32, which is formed onto the annular area, also has an extension 43, which projects toward the soft component 27. The soft component 27, apart from the extension 43 projecting into it, has a rectangular cross-section with a sealing lip 29 formed thereon. Since the material of the soft component 27 is very flexible, it can be easily compressed by the projection 37, thereby forming the sealing area 35. The material of the soft component 27, which is disposed between the shoulder 41 of the lid 11 and the extension 43 of the hard component 26, is compressed such that a damping zone 38 is created. Thus, in this embodiment, too, the sealing area 35 is functionally and geometrically separate from the damping zone area 38.

Figure 8:
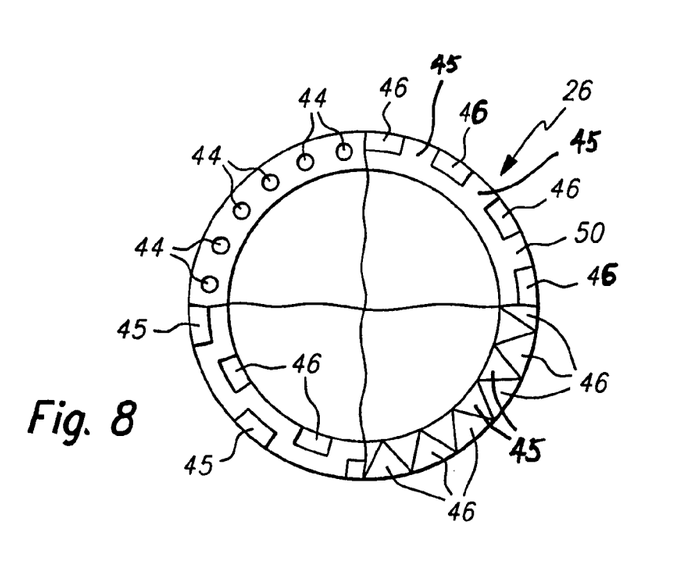
FIG. 8 is a plan view of the hard component of the filter seal.

FIG. 8 is a plan view of the hard component 26 illustrating the side communicating with the housing 10. The round shape shown in this figure is divided into four different sectors representing different embodiments. Instead of a circular shape, the hard component 26 can also have an oval or elliptical shape.

In the upper left area, the hard component 26 is configured in such a way that the flat annular area has bores 44. Pins (not shown) disposed on the communicating housing 10 can engage in these bores 44. The engagement of the pins in the bores 44 secures the filter insert 12 in the housing 10, illustrated in FIGS. 1 and 2, against radial movement. The size and number of the bores 44 can be selected arbitrarily. The distribution of the bores around the circumference can also be selected arbitrarily. If there is only a single bore 44 and a single pin, the filter insert 12 can be mounted only in a single position. If there are several bores 44 in the hard component 26 but only a single pin in the housing 10, the number of the mounting positions of the filter insert 12 corresponds to the number of the bores 44. If there are several bores 44 and several pins, they can be arranged at regular intervals, so that several mounting positions are possible. The intervals between the bores and the pins can also be selected so that only certain installation variants are possible.

Instead of bores 44, it is possible to provide rectangular elevations 45 alternating with indentations 46 on an annular surface 50, as shown in the upper right portion of FIG. 8. The elevations 45 protrude axially above the annular surface 50 and the indentations 46 form a step down. Like the configuration of the bores 44, the number and arrangement of the elevations 45 and the indentations 46 can be selected arbitrarily.

In the lower right portion of FIG. 8, the elevations 45 and indentations 46 are triangular and are distributed uniformly around the circumference of the hard component 26.

In the lower left portion of FIG. 8, the elevations 45 are disposed along the outer periphery and the indentations 46 along the inner periphery, such that the elevations 45 are equidistant from each other, and the indentations 46 are equidistant from each other.

Figure 9:
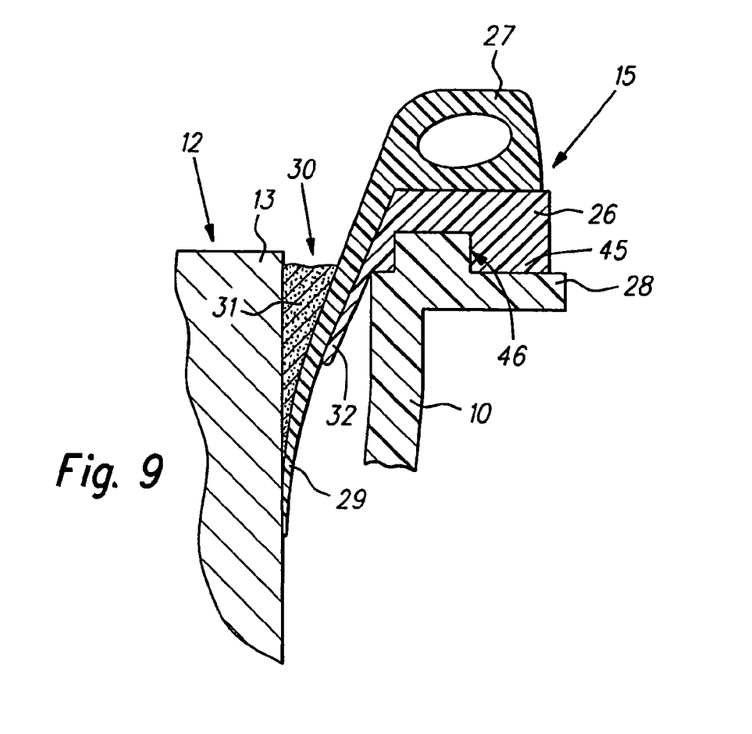
FIG. 9 is a detail view of a seal with a keyed connection.

FIG. 9 illustrates a detail of a seal 15 with a keyed connection. The embodiment of the soft component 27 corresponds to that shown in FIG. 6. The cover 11 is not shown. The seal seat 28 of the housing 10 has a mating geometry which corresponds negatively to the elevations 45 and the indentations 46 of the hard component 26. Thus, parts of the seal seat 28 project into the indentations 46 of the hard component 26. Elevations 45 of the hard component 26 project into recesses in the seal seat 28. This creates a keyed connection between the housing 10 and the filter insert 12 and prevents incorrect mounting of the filter insert 12.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element for the intake air of an internal combustion engine, said filter element comprising a filter body and a seal circumferentially disposed around the filter body, wherein the seal comprises a hard component and a soft component and is bonded to the filter body by an adhesive, and wherein the soft component of the seal comprises a sealing lip which has a linear circumferential contact zone with the filter body, and the sealing lip contacts the filter body in such a way that during manufacture the adhesive remains in a gap formed between the seal and the filter body.

2. A filter element according to claim 1, wherein said filter body is a wound filter body.

3. A filter element according to claim 1, wherein the seal is manufactured using a two-component injection molding process, whereby the soft component is permanently joined at least in partial areas to the hard component.

4. A filter element according to claim 1, wherein the seal comprises a circumferential sealing bead which can be clamped between two housing portions, and the soft component has a sealing area.

5. A filter element according to claim 1, wherein the soft component comprises a vibration damping zone.

6. A filter element according to claim 1, wherein the soft component comprises a hollow interior space.

7. A filter element according to claim 6, wherein said hollow interior space is produced by gas or water-assisted injection molding.

8. A filter element for the intake air of an internal combustion engine, said filter element comprising a filter body and a seal circumferentially disposed around the filter body, wherein the seal comprises a hard component and a soft component and is bonded to the filter body by an adhesive, wherein the hard component comprises a structure with elevations and depressions on its side remote from the soft component.

9. A filter system comprising a filter housing comprising at least two housing sections and having a fluid inlet and a fluid outlet, and a filter element disposed in said filter housing, said filter element comprising a filter body and a seal circumferentially arranged around the filter body and bonded to the filter body by an adhesive, said seal being disposed between the housing sections so as to form a seal and comprising a hard component and a soft component such that the hard component of said seal contacts one of the housing sections and the soft component of said seal contacts the other housing section, wherein the portion of the housing section contacted by the hard component is configured with elevations and depressions which engage corresponding depressions and elevations on the hard component.

10. A filter system according to claim 9, wherein the housing section contacted by the soft component has a circumferential projection which engages the soft component in a sealing manner.

11. A filter system according to claim 9, wherein said housing inlet and outlet are in fluid communication with an intake air tract of an internal combustion engine.

* * * * *

UNITED STATES PATENT AND TRADEMARK OFFICE
CERTIFICATE OF CORRECTION

PATENT NO.        : 7,658,777 B2                                        Page 1 of 1
APPLICATION NO.   : 11/700037
DATED             : February 9, 2010
INVENTOR(S)       : Kopec et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 380 days.

Signed and Sealed this

Thirtieth Day of November, 2010

David J. Kappos
*Director of the United States Patent and Trademark Office*